June 9, 1959 A. E. PRINCE ET AL 2,890,402
OVERLOAD PROTECTIVE DEVICE FOR MOTOR CONTROL SYSTEMS
Filed Jan. 22, 1957 3 Sheets-Sheet 1

ARTHUR ENNIS PRINCE
DAVID CARL LARSON } INVENTORS

BY *Leon H. Emrick* ATTORNEY

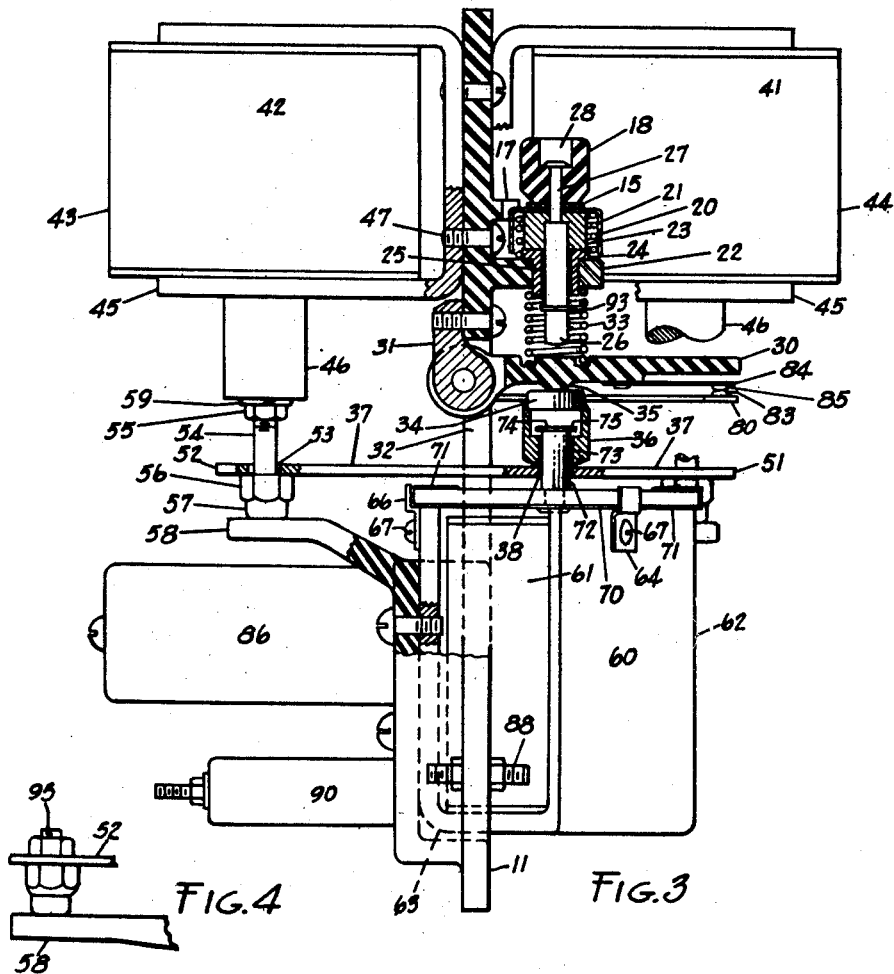
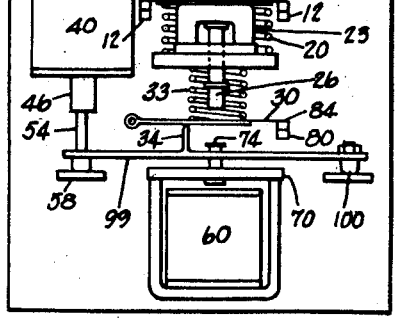
FIG. 4
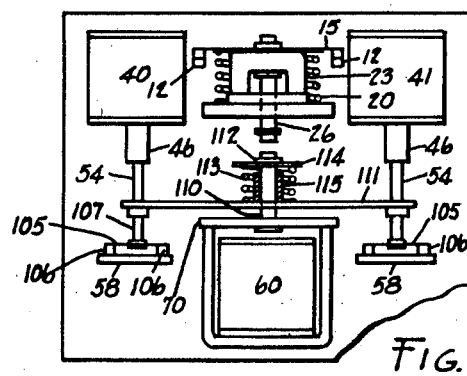
FIG. 3
FIG. 5
FIG. 6
ARTHUR ENNIS PRINCE
DAVID CARL LARSON } INVENTORS
BY [signature] ATTORNEY

ARTHUR ENNIS PRINCE
DAVID CARL LARSON } INVENTORS

BY *[signature]* ATTORNEY

United States Patent Office 2,890,402
Patented June 9, 1959

2,890,402

OVERLOAD PROTECTIVE DEVICE FOR MOTOR CONTROL SYSTEMS

Arthur Ennis Prince, Boonton Township, Morris County, N.J., and David Carl Larson, Yonkers, N.Y., assignors to Otis Elevator Company, New York, N.Y., a corporation of New Jersey Application January 22, 1957, Serial No. 635,394

19 Claims. (Cl. 318—434)

The invention relates to overload protection for electric circuits.

In overload protection, it is undesirable to actuate the overload device in response to transient overload conditions. To prevent such actuation, a time delay is provided. Among such arrangements are those providing inverse time overload protection; that is, the time delay is less, the greater the overload. This gives quicker protection, the greater the overload condition. The invention is particularly directed to overload protective devices of this character.

There is advantage in providing an inverse time overload protective device which is of unitary construction. One such arrangement is that which utilizes a fluid dashpot to obtain the time delay function. It has been found, however, that reliability of such arrangements is affected by gumming, sticking, loss of oil and change in oil viscosity with temperature.

It is the object of this invention to provide an inverse time overload protective device which is economical in construction, may be readily adjusted, is reliable in operation, and minimizes maintenance.

The device may be arranged for single circuit or multiple circuit overload protection. As applied to single circuit overload protection, the invention, according to the preferred arrangement, is carried out by the control of circuit controlling mechanism by two coils, one subject to load current, and the other a direct current restraining coil, opposing the action of the current coil. When an overload occurs, the current coil causes disconnection of the restraining coil from its current supply lines. However, the restraining coil continues its opposing action at a decreasing rate as a result of the discharge of a condenser connected in parallel therewith. The device operates to open the circuit through which protection is effected, when the force exerted by the current coil overcomes that exerted by the restraining coil. With this arrangement, the greater the overload current, the greater the force due to the current coil and thus the sooner the device is actuated.

The invention is especially applicable to multiple overload protection, such, for example, as is employed in variable voltage systems in which a direct current work motor is supplied with current from a variable voltage direct current generator, in turn driven by a two or three-phase alternating current motor. Such systems are extensively used in elevator installations. As applied to such a system, according to the preferred arrangement, three overload current coils are provided, one in the generator armature-motor armature loop circuit so as to be subject to the current flow between the generator and motor, and the other two connected respectively in two of the supply lines to the generator driving motor so as to be subject to current flow in the circuits of this motor. These coils act, upon overload current flow in any one of them or in any combination of them, to cause operation of switching mechanism to disconnect the restraining coil from its source of supply. The restraining coil acts, subject to the discharge of its condenser, to oppose the action of the overload coil or coils until the decreasing opposing force exerted thereby is exceeded by the force exerted by the overload coil or coils. When this occurs, the overload coil or coils act through a member common thereto to exert force for actuating contacts to disconnect the driving motor from its supply lines.

Another example of multiple circuit protection to which the invention is applicable resides in systems employing a three-phase, two-speed alternating current work motor, also extensively used in elevator installations. In such case, two overload current coils are connected respectively in the alternating current supply lines to the work motor and the other operating coil is arranged as a potential coil and connected in circuit so long as operation is on the slow-speed winding. Thus the device acts to limit the time that operation may be had on the slow-speed winding. In the case of single-speed, two or three-phase alternating current work motor installations, two overload current coils are utilized connected respectively in alternating current supply lines.

Thus, with all such applications of the invention, overload protection is provided which, upon occurrence of overload conditions, causes disconnection of the mechanism being protected upon expiration, after the overload condition arises, of a time interval which varies inversely with the amount of the overload current. Temporary overload conditions which are not severe do not cause actuation of the protective device, yet an overload, if severe enough, such as a short circuit, can cause instantaneous operation.

Features and advantages of the invention will be gained from the above and from the following description and appended claims.

In the drawings:

Figure 3 is an enlarged side view of the same, with parts broken away to show details of construction;

Figure 4 is a fragmental detail showing an alternative arrangement for when but two overload coils are provided;

Figure 5 is a schematic view of the device utilizing but one overload coil;

Figure 6 is a schematic view illustrating an alternative construction;

Figure 1:
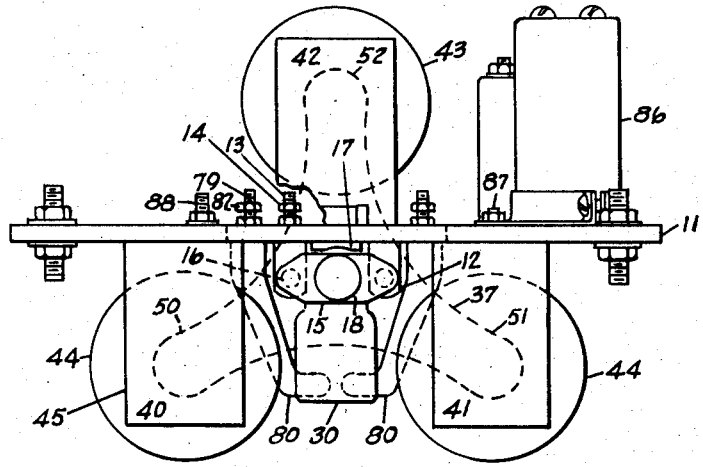
Figure 1 is a plan view of the preferred construction of an inverse time overload protective device embodying the invention and utilizing three overload coils.
Figure 2:
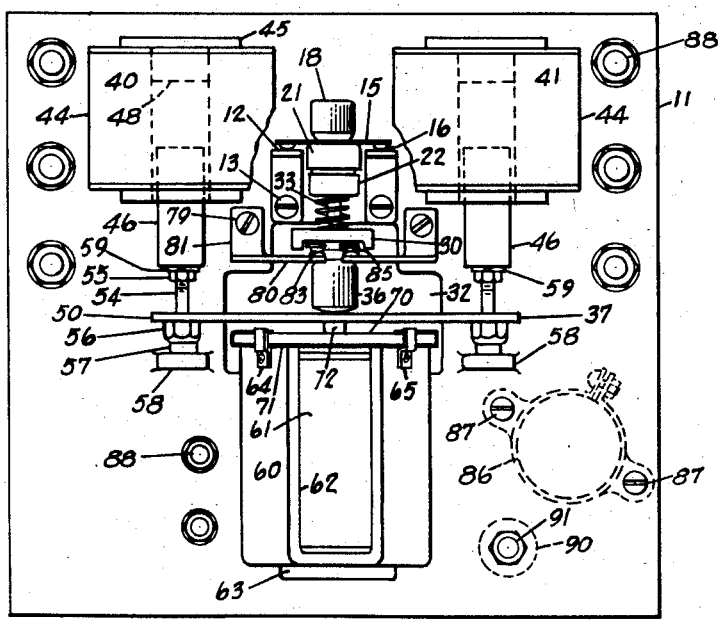
Figure 2 is a view of the same in front elevation.

Referring first to Figures 1, 2 and 3, the protective device is mounted on a panel 11 of insulating material. A pair of stationary L-shaped contacts 12 with contact inlays are secured to the panel as by screws 13. Binding nuts 14 are provided on the screws for connecting the contacts in the system. These contacts are engaged by a yieldable bridging contact 15 having contact tips 16 for engaging the contact inlays. Projections 17 from the panel cooperate with contact 15 to keep it aligned with contacts 12. The bridging contact is pushed into position engaging the stationary contacts by a button 18 acting against the force of a spring 20 extending between the top of an inverted cup 21 and a projection 22 extending from panel 11. The bridging contact is latched in this position by a permanent magnet 23 engaging a bushing 24 of magnetizable material. This bushing is mounted in projection 22 and has an aperture 25 for receiving a plunger 26 of non-magnetic material. The plunger 26, magnet 23, cup 21, bridging contact 15 and button 18 are secured together as a unit, as by peening over the end of a stem 27 formed on the plunger and extending into a depression 28 in the button.

The plunger 26 is moved upwardly against the force of the magnetic latch to disengage the bridging contact 15 from the stationary contacts 12. This is effected by upward movement of a lever 30 of insulating material, pivotally mounted on a bracket 31. The lever extends through an aperture 32 in panel 11, the bracket 31 being secured to the back of the panel. Normally, the lever is disengaged from the plunger. A spring 33 extends between lever 30 and projection 22 and biases the lever into disengaged position. Movement of the lever to strike the plunger is effected through a bumper 34 which is in contact with a lug 35 formed on the bottom of the lever. This bumper is held in a sleeve 36 which rests upon a spider 37.

Upward movement of sleeve 36 and thus of lever 30 is effected by spider 37 through actuation thereof by any one of three overload electromagnets 40, 41 and 42. Each of these electromagnets comprises a coil 43, 44, a movable core 46 and a stationary core 48, with the coil positioned in a U-shaped frame 45. The magnets are secured to panel 11 as by screws 47 extending into the frames. Magnets 40 and 41 are mounted on the front of panel 11 and magnet 42 on the rear in position so that the centers of their movable cores align respectively with the arms 50, 51 and 52 of the spider. An aperture 53 is provided in each arm through which a bolt 54 extends, the aperture providing ample operating clearance for the bolt. These bolts are adjustably secured to the cores of the electromagnets as by nuts 55, shakeproof lock washers 59 being provided under the nuts. The heads 56 of these bolts are provided with resilient bumpers 57 which rest on projections 58 extending from panel 11. Upon sufficient current flow in any one of these electromagnet coils, say the coil of electromagnet 40, its movable core is pulled upwardly, pulling upwardly on arm 50. The other arms of the spider fulcrum on corresponding projections 58, resulting in upward movement of sleeve 36 and thus of lever 30.

The action of an overload electromagnet to lift the spider and thus cause the disengagement of bridging contact 15 from stationary contacts 12 is opposed by restraining electromagnet 60. This electromagnet comprises a direct current coil 61 positioned in a three-legged frame 62, the legs of the frame being aligned with the arms of the spider. The coil and frame are supported in a recess 63 in panel 11. The restraining electromagnet is provided with an armature 70 having a non-magnetic facing 71. A stem 72 secured to the armature extends upwardly through aperture 38 in spider 37 and aperture 73 in sleeve 36, these apertures providing operating clearance. The stem is provided with a cap 74 which extends over shoulders 75 formed in the sleeve. When spider 37 is moved upwardly by one or more of the overload coils, initially it effects upward movement of sleeve 36 to take up the clearance between shoulders 75 and cap 74. Further upward movement is opposed by the holding of armature 70 in contact with frame 62 by restraining electromagnet 60. A plurality of non-magnetic clips 64, 65, 66 are provided, one for each leg of frame 62, and are secured to these legs by screws 67. The clips serve to prevent the armature 70 getting off center with respect to the restraining electromagnet as a result of the clearances provided by apertures 36 and 53 in the spider 37.

This initial movement of sleeve 36 is utilized to disconnect the coil of the restraining electromagnet from its source of direct current supply. A pair of stationary contacts 80 are secured as by screws 79 extending through arms 81 of the contacts to panel 11. Binding nuts 82 on these screws serve for connecting the contacts in the circuits. The other arms of the contacts extend outwardly from the panel and converge. The outer ends of these arms are provided with contact tips 83. These contacts are bridged by a contact 84 in the form of a leaf spring secured to the underside of lever 30. At the outer end, the contact spring is bifurcated and the arms formed thereby are provided with contact tips 85 for engaging contact tips 83 on the stationary contacts. Upon upward movement of sleeve 36 to take up the clearance between shoulders 75 and cap 74, lever 30 is swung upwardly about its pivot by bumper 34 sufficiently to disengage contact 84 from stationary contacts 80. This breaks the energizing circuit for the coil of the restraining electromagnet.

Condenser 86 discharges into the coil of the restraining electromagnet when the energizing circuit for the coil is broken, to cause a gradually decreasing opposing action. The condenser is secured to the back of panel 11 as by screws 87. Also, a resistor 90 is secured to the back of panel 11 as by a screw 91, this resistor being connected in series with condenser 86 to limit the charging current. 88 are studs for connecting the various coils in the system.

When the magnetizing force exerted by the restraining electromagnet is of a value that it is overcome by the force exerted by the overload electromagnet, armature 70 is released, enabling further upward movement of sleeve 36 and lever 30 to take place. As a result, the space between the lever and the bottom of plunger 26 is taken up, the movable core of the overload electromagnet pulling up into the coil to decrease the air gap between this core and the stationary core. This increases the force exerted by the movable core, causing the lever to strike the plunger a hammer blow to force the disengagement of the permanent magnet 23 from bushing 24 and thus the disengagement of bridging contact 15 from stationary contacts 12. A washer 93 is fixed on the lower portion of plunger 26 to limit the upward movement thereof.

When contact 15 disengages contacts 12, the system is disconnected from the supply lines, de-energizing the overload coils. As a result, lever 30 falls back and with it armature 70 which comes to rest on one or more of the clips 64, depending on which one or more of the operating electromagnets caused the operation, this action being assured by spring 33. Thus, contacts 80, 84 are not re-engaged, also, bridging contact 15 does not engage contacts 12, being retained in disengaged condition by spring 20. For example, if electromagnet 42 caused the operation, it would pull the spider toward it and along with it armature 70, so that the armature would fall back on clip 66. This shows that electromagnet 42 caused the operation, facilitating correction. When the condition which caused the overload is corrected, armature 70 is centered and bridging contact 15 is manually forced down into engagement with contacts 12 by pushing on button 18. With the engagement of permanent magnet 23 with bushing 24, the contacts are latched in engaged condition, permitting the button to be released.

The positions of the movable cores 46 in the coils are adjusted by the bolts 54 so that upward movement of sleeve 36 to effect the opening of contacts 80, 84 is prevented unless an overload current above a certain amount exists. The greater this overload current, the greater the force tending to release armature 70 against the decaying force exerted by the restraining electromagnet and thus the sooner contacts 15, 12 are separated. Thus an inverse time function is provided. Should the overload cease to exist before armature 70 is released, the operated movable core, spider 37 and sleeve 36 are dropped back, re-engaging contacts 80, 84. Thus operation of the device in case of temporary small overloads is obviated.

In a system in which only two overload coils of the protective device are utilized, electromagnet 42 on the back of panel 11 may be omitted. In that case, a fulcrum may be provided for arm 52 of the spider 37 by connecting a short stud 95 to the arm in place of adjusting bolt 54, with the head of the stud provided with a bumper for engaging projection 58, as shown in Figure 4.

An arrangement utilizing only one overload coil is diagrammatically illustrated in Figure 5. In this construction, the arrangement of the contacts 12, 15, spring 20, latching magnet 23, plunger 26, lever 30, spring 33, overload magnet 42, movable core 46, bolt 54, restraining electromagnet 60, its armature 70, and contacts 80, 84 may be the same as in the construction of Figures 1, 2 and 3. A different arrangement of bumper 34 and cap 74 has been indicated and the member 99 operated by overload magnet 42 has been indicated as fulcrumed at 100. However, for production purposes, this too could be the same as in Figures 1, 2 and 3, with member 100 the spider 37 fulcrumed on the other two arms as indicated in Figure 4.

The construction of the protective device may vary. For example, an alternative arrangement is diagrammatically illustrated in Figure 6 in which, instead of contacts 80, 84 common to the overload electromagnets, each overload electromagnet is provided with individual contacts. This is shown for two overload electromagnets. In this construction, the contacts 12, 15, spring 20, latching magnet 23, plunger 26, overload electromagnets 40, 41, cores 46, restraining electromagnet 60 and its armature 70 may be the same as in the construction illustrated in Figures 1, 2 and 3. The lever 30 and contacts 80, 84 are omitted and in their stead each overload electromagnet is provided with a contact disc 105 adapted to engage stationary contacts 106 mounted on projection 58. The bridging contact disc is provided with a stem 107 which is secured in the head of the adjusting bolt 54. The stem 110, on armature 70, extends upwardly through an aperture in the cross member 111 between the adjusting bolts 54 and is provided at its top with a cap 112. A spring 113 extends between a washer 114, on stem 110 beneath cap 112, and cross member 111, biasing this member into position with contact discs 105 engaging contacts 106. A sleeve 115 through which stem 110 extends is provided on cross member 111, a small clearance being provided between the top of this sleeve and washer 114.

Upon sufficient overload current flowing, say in the coil of electromagnet 40, cross member 111 is lifted up, fulcruming on bolt 54 for electromagnet 41, until sleeve 115 strikes washer 114. This movement is sufficient to disengage the contact disc 105 from stationary contacts 106. The contacts operated by the various overload electromagnets are connected in series relationship in this circuit for the coil of the restraining electromagnet. Thus the disengagement of disc 105 from contacts 106 disconnects the coil of the restraining electromagnet from its supply lines, the current in this coil then being subject to the discharge of its condenser as in the case of the construction of Figures 1, 2 and 3. If the overload persists, upon the expiration of a time interval dependent upon the amount of overload, armature 70 is released and the upper end of stem 110 strikes plunger 26, separating contacts 12, 15.

When utilized in an arrangement having three overload electromagnets, the cross member in the construction of Figure 6 may be in the form of the spider 37 of Figures 1, 2 and 3. When only two overload electromagnets are provided, a spider 37 may be utilized fulcrumed on the remaining arm, as indicated in Figure 4, or a member extending straight across may be utilized with the other parts positioned accordingly. In case of a single overload coil, a spider may be utilized fulcrumed on the two remaining arms as in Figure 4, or a straight across member, fulcrumed as in Figure 5, may be employed.

Figure 7:
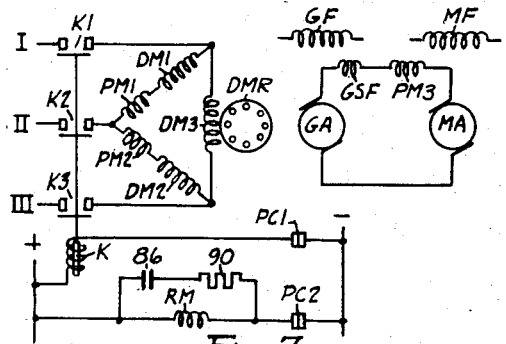
Figure 7 is a wiring diagram illustrating the connections of the protective device in a variable voltage system.
Figure 8:
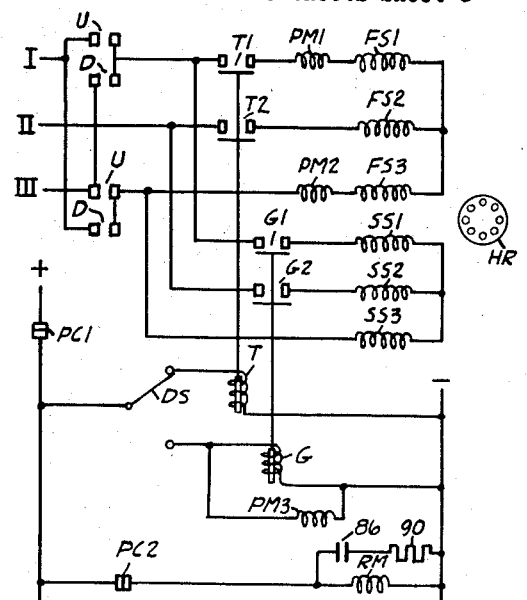
Figure 8 is a wiring diagram illustrating the connections of the device in two-speed, three-phase alternating current work motor circuits.
Figure 9:
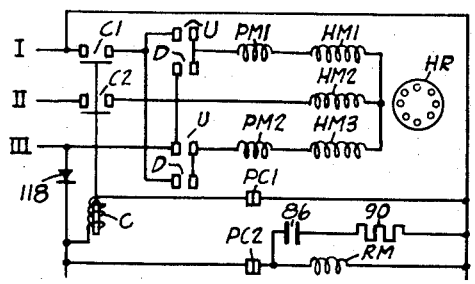
Figure 9 is a wiring diagram illustrating the connections of the device in single-speed, three-phase alternating current work motor circuits.

Connections of the protective device in simplified circuits are shown in Figures 7, 8, and 9. In these figures, the coils of the overload electromagnets 40, 41, 42 are designated as PM with differentiating numerals, the coil of the restraining electromagnet 60 as RM, contacts 12, 15 as PC1 and contacts 80, 84 (or 105, 106 in series) as PC2. The device is particularly suitable for protecting installations with alternating current supply and thus installations involving alternating current sources have been illustrated. However, it is to be understood that it is also applicable where direct current sources are provided, as where the source for the driving motor for the generator in Figure 7 is a direct current one, and when resistant controlled direct current hoisting motors are employed. The coil of the restraining electromagnet is connected in an initiating circuit, that is one that provides current event though the protective device has operated.

In Figure 7, connections are indicated for a variable voltage system for, say a direct current elevator hoisting motor. The armature of the hoisting motor is designated MA and its field winding MF. The armature of the generator which supplies direct current to the hoisting motor armature is designated GA, its series field winding GSF and its shunt field winding GF. The generator armature is driven by a three-phase, alternating current induction motor having stator windings designated DM1, DM2 and DM3 and connected in either delta or star relation, and its rotor designated DMR. K is the switch for connecting the stator windings of the driving motor to alternating current supply mains I, II, and III. Two of the coils of the protective device PM1 and PM2 are connected respectively in series with stator windings DM1 and DM2 of the driving motor, thereby being subject to current flow in any one of the supply mains. The remaining coil PM3 of the protective device is connected in the loop circuit connecting generator armature GA and motor armature MA. Upon the occurrence of overload current in any one or more of these coils, contacts PC2 separate to disconnect coil RM of the restraining electromagnet from its supply lines + and —. Condenser 86 then discharges into coil RM and, if the overload persists, on expiration of a time interval determined by the amount of overload, contacts PC1 separate to disconnect the coil of switch K from the supply lines. As a result, contacts K1, K2 and K3 separate to disconnect the driving motor from the alternating current supply mains.

In Figure 8, connections are indicated for a two-speed alternating current hoisting motor. The rotor of the hoisting motor is designated as HR, the fast-speed windings FS1, FS2 and FS3 and the slow-speed windings SS1, SS2 and SS3. T is the electromagnetic switch for connecting the fast-speed stator windings to alternating current supply mains I, II, and III. G is the electromagnetic switch for connecting the slow-speed stator windings to the supply mains. For convenience, the control mechanism for determining whether switch T or G is operated is indicated as a single-pole, double-throw switch DS. U and D are contacts of direction switches. In this arrangement, two overload coils are utilized connected in circuit with the fast-speed stator windings, coil PM1 being connected in circuit with winding FS1 and coil PM2 in circuit with winding FS3 so as to be subject to current flow in any one of the alternating current supply mains. Inasmuch as the amount of current which flows in the slow-speed windings is low, the third coil PM3 of the protective device is wound as a direct current coil of a number of turns sufficient to cause operation of the device, should the motor remain on slow-speed operation for more than a predetermined interval of time. For this purpose coil PM3 may be connected in parallel with the coil of slow-speed switch G. When on fast-speed operation, should an overload occur in any phase, the appropriate overload coil causes operation of the device to separate contacts PC2. This disconnects the coil RM of the restraining magnet from the direct current supply lines, the current in this coil thereafter gradually falling off as the condenser 86 discharges. If the overload persists, at the expiration of a time interval determined by the amount of the overload, contacts PC1 separate to disconnect the coil of fast-speed switch T from the direct current supply lines, with the result that contacts T1, T2 separate to disconnect the fast-speed stator windings of the hoisting motor from the alternating current supply mains. When the hoisting motor is connected for slow-speed operation, coil PM3 is energized, causing the separation of contacts PC2. Should the motor remain on slow-speed operation for more than a predetermined length of time, which is an indication that something has gone wrong with the operation, the condenser 86 discharges to a point to permit the separation of contacts PC1. This disconnects the coil of slow-speed switch G from its supply lines and contacts G1 and G2 separate disconnecting the slow-speed windings of the hoisting motor from the alternating current supply mains.

In Fig. 9, connections are indicated for a single-speed alternating current hoisting motor in which the rotor is designated HR and the stator windings as HM1, HM2, HM3. Only two overload coils PM1 and PM2 are utilized, these being connected in circuit with windings HM1 and HM3. Should an overload occur, contacts PC2 are separated and, if the overload persists, upon the expiration of a given time interval, contacts PC1 separate to disconnect coil of switch C from the direct current supply lines. As a result, contacts C1 and C2 separate to disconnect the hoisting motor stator windings from the alternating current supply mains I, II and III.

It is to be understood that the direct current for the restraining coil may be derived from the alternating current mains through a unidirectional current conducting device. Such arrangement is illustrated for example in Figure 9 in which the circuit for the restraining coil extends from supply mains I and III through a rectifier 118.

Referring again to the construction illustrated in Figures 1, 2 and 3, each of the operating electromagnets 40, 41, 42 is adjusted to provide the same pull for the same amount of magnetic force exerted thereby. Also, they are adjusted to effect the separation of contacts 80, 84 only upon the overload current being at or above a certain value. In elevator operation, the adjustment is preferably so that this operation does not take place unless the overload current reaches a value equivalent to single-phase stalled conditions. These adjustments are effected by bolts 54. The overload current may surpass this stalled current value and the amount is dependent upon the conditions causing the fault. In case of a dead short-circuit, the amount of current flow will be so great as to cause instantaneous operation.

With the operating electromagnets adjusted to provide the same pull, the amount of force exerted on sleeve 36 for unlatching the contacts is the same regardless of whether the overload current flows in one, two or three of the electromagnet coils. With F1, F2 and F3 the forces exerted on the ends of the arms of the spider 37 and D the altitude of the triangle formed by these arms, then the force exerted at the center of the spider is:

$$\frac{F1 \times D}{D/3} = 3F1 \text{ for overload in one coil}$$

$$\frac{(F1+F2)D}{2D/3} = \frac{2F1 \times D}{2D/3} = 3F1 \text{ for overload in two coils}$$

$$F1+F2+F3 = 3F1 \text{ for overload in all three coils}$$

Thus the same timing is provided regardless of the number of coils subject to the overload.

Figure 10:
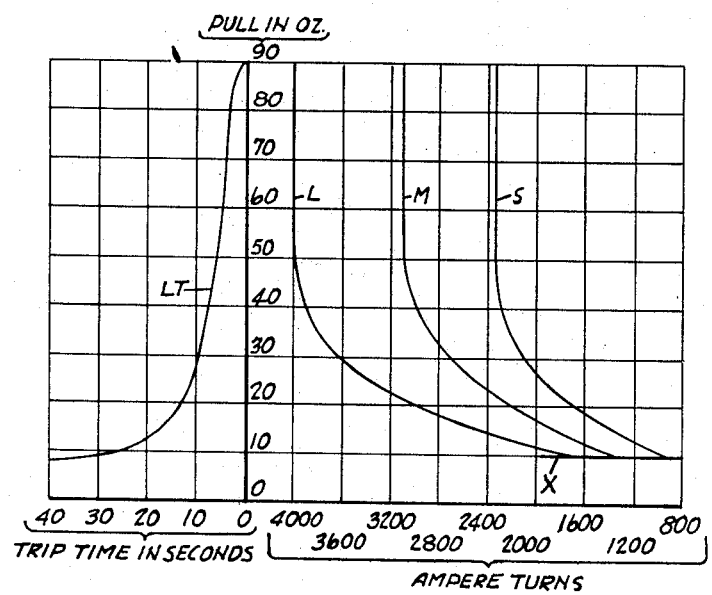
Figure 10 is a curve sheet of operational characteristics.

Curves representative of operational characteristics of the device are shown in Figure 10. In these curves, on the right of the ordinate, the pull in ounces at the end of one of the arms of the spider is plotted against the ampere turns of the coil of the electromagnet which operates that arm. Curves for three different air gap settings (positions of the core in the magnet) are shown, namely, for small, medium and large air gaps, designated S, M and L respectively. On the left of the ordinate, operating time in seconds is plotted against the decaying pull of the restraining electromagnet, as shown by curve OT. No operation is had for a pull below line X as it takes the pull represented by this line, i.e., 10 ounces, to effect the separation of contacts 80, 84. Upon operation of the device at this minimum pull, 25 seconds timing is had for operating contacts 12, 15. The time decreases as the pull increases. This may be due to a greater value of overload current flow in the coil. For example, with the large air gap, a maximum time of 25 seconds is had with 1700 ampere turns' excitation, whereas the time is reduced to 10 seconds when the excitation is 3600 ampere turns. With the medium setting air gap, 25 seconds time is had with 1400 ampere turns' excitation and 10 seconds time is had with 2600 ampere turns. With the small air gap setting, 25 seconds time is had with 900 ampere turns' excitation and 10 seconds time is had with 2100 ampere turns. In addition to these adjustments, different operating time may be had by varying the size of capacitor 86. Thus, the protective device with the same electromagnet coils is adapted for a large number of duties, the desired operational characteristic for each duty being had by adjustment of the air gaps. Therefore, as the device is suitable for many different systems and for a large number of duties in these various systems, it has a wide range of application. This greatly minimizes the number of different devices to be carried in stock.

The device is very sensitive and it has been found that it will drop back to re-engage contacts 84, 80 when the excitation falls 5% below the minimum which effects the separation of these contacts. Thus, although the starting current for a motor effects the separation of contacts 84, 80, as this current falls off as the speed increases, these contacts re-engage to prevent unwanted operation of the protective device. This operation takes place very quickly, almost instantaneously. Thus in making operations, for example, the contacts re-engage quickly with each starting operation without causing separation of contacts 12, 15. In thermal overload devices for example, they do not cool off readily with the result that the heat accumulates on repeated operations and may cause unwanted operation. In the case of dashpot retarded devices, the restoring action is slowed by the dashpot, with the result that the device may not fall back as far as the starting point. As this accumulates, repetitive operations may result in unwanted operation of the device.

Not only is the protective device suitable for a wide range of applications and duties, but the accuracy with which it may be adjusted enables it to be set in the factory, thereby saving considerable field adjustment time. There is very little maintenance involved. Since the mechanism is exposed to view, visual inspection readily determines whether the device is functioning as the sleeve 36 is operated to separate contacts 80, 84, each time a starting operation is effected.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system for protecting against overload current flow in a circuit, an overload protective device having an operating electromagnet subject to current flow in said circuit, a restraining electromagnet excited to oppose the action of said operating electromagnet, means responsive to excitation of said operating electromagnet by overload current in said circuit above a certain value for causing a retarded decay in the excitation experienced by said restraining electromagnet and thus a gradual decrease in the effectiveness of said opposing action, and switching mechanism operable at a time subsequent to the actuation of said retarded decay causing means and in response to said operating electromagnet when the force exerted thereby overcomes the decaying opposing force exerted by said restraining electromagnet for causing opening of said circuit, said subsequent time interval bearing an inverse relation to the magnitudes of said overload currents.

2. In a system for protecting against overload current flow in a circuit, an overload protective device having an operating electromagnet subject to current flow in said circuit, means controlling said circuit, operating means for said circuit controlling means, a restraining electromagnet for exerting force on said operating means to oppose operation thereof, a source of unidirectional current for the coil of said restraining electromagnet, means responsive to the flow of overload current in said operating electromagnet coil for disconnecting said restraining electromagnet coil from its source and for exerting force on said operating means for operating said circuit controlling means opposed by the force exerted by said restraining electromagnet, and means for retarding the decrease in said opposing force upon disconnection of said restraining electromagnet coil from its source to prevent operation of said first named circuit controlling means until said opposing force is overcome by said operating force.

3. In a system for protecting against overload current flow in a circuit, an overload protective device having an operating electromagnet subject to current flow in said circuit, means controlling said circuit, operating means for said circuit controlling means, a restraining electromagnet for exerting force on said operating means to oppose operation thereof, a source of unidirectional current for the coil of said restraining electromagnet, means responsive to the flow of overload current in said operating electromagnet coil for disconnecting said restraining electromagnet coil from its source and for exerting force on said operating means for operating said circuit controlling means opposed by the force exerted by said restraining electromagnet, and means for retarding the decrease in said opposing force upon disconnection of said restraining electromagnet coil from its source to prevent operation of said first named circuit controlling means until said opposing force is overcome by said operating force, said disconnecting means acting quickly to reconnect said restraining electromagnet coil to its source upon the fall off below a certain value of said overload current before operation of said circuit controlling means.

4. In a system for protecting against overload current flow in a circuit, an overload protective device having an operating electromagnet subject to current flow in said circuit, a restraining electromagnet excited to oppose the action of said operating electromagnet, means responsive to the excitation of said operating electromagnet by the flow of overload current in said circuit for causing opening of said circuit provided said overload is great enough that the force exerted by said operating electromagnet overcomes that exerted by said restraining electromagnet, and means responsive to said overload excitation of said operating electromagnet for causing a retarded decay in the excitation experienced by said restraining electromagnet to delay, in the event that force exerted by said operating electromagnet is not strong enough initially to overcome that exerted by said restraining electromagnet, operation of said first named means until the force exerted by said restraining electromagnet is overcome by that exerted by said operating electromagnet.

5. In a system for protecting against overload current flow in a circuit, an overload protective device having an operating electromagnet subject to current flow in said circuit, means controlling said circuit, operating means for said circuit, controlling means, a restraining electromagnet for exerting force on said operating means to oppose operation thereof, a source of unidirectional current for the coil of said restraining electromagnet, circuit controlling means connecting said restraining electromagnet coil to its source, means responsive to the flow of overload current in said operating electromagnet coil for operating said second named circuit controlling means to disconnect said restraining electromagnet coil from its source and for exerting force on said operating means for operating said first named circuit controlling means opposed by the force exerted by said restraining electromagnet, and means for retarding the decay of current in said restraining electromagnet coil upon disconnection thereof from its source and thus the decrease in said opposing force to prevent operation of said first named circuit controlling means until said opposing force decreases to a certain value dependent upon the amount of said overload current flow.

6. In a system subject to overload current flow in a plurality of circuits, an inverse time limit overload protective device comprising a movable member, a plurality of operating electromagnets, the coils of which are connected in said circuits, for exerting force in an amount dependent upon the extent of overload in said circuits for moving said member, a restraining electramognet for exerting force to oppose movement of said member by said operating electromagnets beyond a certain extent, said restraining electromagnet initially acting to allow a certain amount of movement of said member, a source of unidirectional current for the coil of said restraining electromagnet, circuit controlling means operable by said certain movement of said member for disconnecting said restraining electromagnet coil from its source, means for retarding the decay of current in said restraining electromagnet coil upon disconnection thereof from its source and thus the decrease in said opposing force, and circuit controlling means for said first named circuits operable by movement of said member beyond said certain amount when the said operating force exerted thereon overcomes the opposing force exerted by said restraining electromagnet.

7. In a system subject to overload current flow in a plurality of circuits, an inverse time limit overload protective device having a plurality of operating electromagnets, the coils of which are connected in said circuits, means controlling said circuits, operating means for said circuit controlling means, a restraining electromagnet for exerting force on said operating means to oppose operation thereof, a source of unidirectional current for the coil of said restraining electromagnet, circuit controlling means connecting said restraining electromagnet coil to its source, a member common to said operating electromagnets and operable by any one or more of said operating electromagnets under overload current conditions for actuating said second named circuit controlling means to disconnect said restraining electromagnet coil from its source and for exerting force on said operating means for operating said first named circuit controlling means opposed by the force exerted by said restraining electromagnet, and means for retarding the decay of current in said restraining electromagnet coil upon disconnection thereof from its source and thus the decrease in said opposing force to prevent operation of said first named circuit controlling means until said opposing force decreases to a certain value dependent upon the amount of said overload current flow.

8. In a system subject to overload current flow in a plurality of circuits, an inverse time limit protective device having a plurality of operating electromagnets, the coils of which are connected in different ones of said circuits, means controlling said circuits, operating means for said circuit controlling means, a member common to said operating electromagnets adapted upon any one or more of said operating electromagnets experiencing a certain excitation to exert force on said operating means for operating said circuit controlling means, a restraining electromagnet for exerting force on said operating means in opposition to said operating force, means for supplying unidirectional current for the coil of said restraining electromagnet, means operable by said member upon said certain excitation of any one of said operating electromagnets for disconnecting said restraining electromagnet coil from said current supply means, and means for retarding the decay of current in said restraining electromagnet coil upon disconnection thereof from said current supply means and thus the decrease in said opposing force to prevent operation of said first named circuit controlling means by said member until said opposing force decreases to a certain value.

9. In a variable voltage system in which a direct current work motor is supplied with current by a variable voltage direct current generator driven by a motor having a current supply circuit, an inverse time limit overload protective device having a plurality of spaced operating electromagnets, the coils of which are respectively connected in the generator armature-work motor armature loop circuit and said supply circuit, circuit controlling means adapted upon operation to cause disconnection of said driving motor from its supply circuit, operating means for said circuit controlling means, a member common to said operating electromagnets adapted upon the flow of overload current in any one or more of said operating electromagnet coils to exert force on said operating means for operating said circuit controlling means, a restraining electromagnet for exerting force on said operating means in opposition to said operating force, a source of unidirectional current for the coil of said restraining electromagnet, a second circuit controlling means operable by said member upon said flow of overload current for disconnecting said restraining electromagnet coil from its source, and a capacitor for discharging current into said restraining electromagnet coil upon disconnection thereof from its source to retard the decrease in said opposing force, whereby when said opposing force decreases to a certain value dependent upon the amount of said overload current flow said operating means is actuated by said member to operate said first named circuit controlling means.

10. In a variable voltage system in which a direct current work motor is supplied with current by a variable voltage direct current generator of a motor generator set, the driving motor of which is a three-phase alternating current motor supplied with current by supply lines from a three-phase alternating current source, an inverse time limit overload protective device having three triangularly spaced electromagnets, the coil of one of said electromagnets being connected in the generator armature-work motor armature loop circuit and the coils of the other two electromagnets being connected in separate ones of of said supply lines for the generator driving motor, circuit controlling means adapted upon operation to cause disconnection of said driving motor from its supply lines to shut down said motor generator set, operating means for said circuit controlling means, a triangular member common to said electromagnets adapted upon the flow of overload current in any one or more of said electromagnet coils to exert force on said operating means for operating said current controlling means, a restraining electromagnet for exerting force on said operating means opposing that due to said member upon said flow of overload current, a source of direct current for the coil of said restraining electromagnet, second circuit controlling means operable by said member upon said flow of overload current for disconnecting said restraining electromagnet coil from its source, a resistor, and a condenser with said resistor in series therewith connected in parallel with said restraining electromagnet coil for discharging current therein to retard the decay of flux in said restraining electromagnet and thus the decrease in opposing force exerted thereby, whereby when said opposing force decreases to a certain value dependent upon the amount of said overload current flow, said operating means is operated by said member to operate said first named circuit controlling means.

11. In a system for protecting against overload current flow in a polyphase alternating current motor, polyphase alternating current supply lines for said motor, an overload protective device having a plurality of operating electromagnets, the coils of which are connected to be subject to current flow in said supply lines, means controlling the connection of said motor to said supply lines, operating means for said connection controlling means, a restraining electromagnet for exerting force on said operating means to oppose operation thereof, a source of unidirectional current for the coil of said restraining electromagnet, means common to said operating electromagnets and responsive to the flow of overload current in one or more of said operating electromagnet coils for disconnecting said restraining electromagnet coil from said current supply means and for exerting force on said operating means for operating said connection controlling means opposed by the force exerted by said restraining electromagnet, and means for retarding the decrease in said opposing force upon disconnection of said restraining electromagnet coil from said current supply means to prevent operation of said connection controlling means until said opposing force is overcome by said operating force.

12. In a system for protecting a two-speed three-phase alternating current work motor, three-phase alternating current supply lines for said motor, means for connecting said motor to said supply lines for fast or slow speed operation, a protective device having three operating electromagnets, the coils of two of which are connected to be subject to current flow in said supply lines, means for causing the application of voltage to the other of said coils so long as said motor is connected for slow speed operation, means controlling operation of said connecting means, operating means for said controlling means, a restraining electromagnet for exerting force on said operating means to oppose operation thereof, means for supplying unidirectional current for the coil of said restraining electromagnet, means common to said operating electromagnets and responsive to the flow of overload current in the coil of either of said two operating electromagnets or said application of voltage to said other coil for disconnecting said restraining electromagnet coil from said current supply means and for exerting force on said operating means for operating said controlling means opposed by the force exerted by said restraining electromagnet, and means for retarding the decrease in said opposing force upon disconnection of said restraining electromagnet coil from said current supply means to prevent operation of said controlling means until said opposing force is overcome by said operating force.

13. In a protective system for plural circuits, a protective device having a plurality of operating electromagnets, the coils of two of which are connected to be subject to current flow in said circuits, switching means for controlling said circuits, operating means for said switching means, a restraining electromagnet for exerting force on said operating means to oppose operation thereof, means for supplying unidirectional current for the coil of said restraining electromagnet, means common to said operating electromagnets and responsive to certain current flow in the coils of said electromagnets for disconnecting said restraining electromagnet coil from said current supply means and for exerting force on said operating means for operating said switching means opposed by the force exerted by said restraining electromagnet, and means for retarding the decrease in said opposing force upon disconnection of said restraining electromagnet coil from said current supply means to prevent operation of said switching means until said opposing force is overcome by said operating force.

14. In a protective system for plural circuits, a protective device having a plurality of operating electromagnets, the coils of which are respectively connected to be subject to current flow in said circuits, switching means for controlling at least certain of said circuits, operating means for said switching means, a restraining electromagnet for exerting force on said operating means to oppose operation thereof, means for supplying unidirectional current for the coil of said restraining electromagnet, additional switching means common to said operating electromagnets, means common to said operating electromagnets and responsive to certain current flow in the coil of any one of said electromagnets for causing operation of said additional switching means to disconnect said restraining electromagnet coil from said current supply means and for exerting force on said operating means for operating said first named switching means opposed by the force exerted by said restraining electromagnet, and means for retarding the decrease in current flow in the coil of said restraining electromagnet and thus in said opposing force upon disconnection of said restraining electromagnet coil from said current supply means to prevent operation of said first named switching means until said opposing force is overcome by said operating force.

15. In a protective system for plural circuits, a protective device having a plurality of operating electromagnets, the coils of which are respectively connected one in each of said circuits to be subject to current flow therein, switching means for controlling at least certain of said circuits, operating means for said switching means, a restraining electromagnet for exerting force on said operating means to oppose operation thereof, means for supplying unidirectional current for the coil of said restraining electromagnet, a plurality of additional switching means, one for each of said operating electromagnets, means responsive to certain current flow in the coil of any one of said electromagnets for causing operation of said additional switching means for that electromagnet to disconnect said restraining electromagnet coil from said current supply means and for exerting force on said operating means for operating said first named switching means opposed by the force exerted by said restraining electromagnet, and means for retarding the decrease in current flow in the coil of said restraining electromagnet and thus in said opposing force upon disconnection of said restraining electromagnet coil from said current supply means to prevent operation of said first named switching means until said opposing force is overcome by said operating force.

16. In a system for protecting against overload current flow, an inverse time overload protective device comprising, circuit controlling contacts, means actuatable to operate said contacts, additional circuit controlling contacts, a member adapted to actuate said means, said member having a plurality of operating arms, a plurality of overload operating electromagnets, one for each operating arm, for causing operation of said additional contacts and for causing said member to exert force in an amount determined by the extent of the overload for actuating said means, a restraining electromagnet controlled by said additional contacts and operable upon actuation of said additional contacts to exert force to oppose actuation of said means by said member to operate said first named contacts until such force is overcome by the force exerted by said member, and means operable after actuation of said additional contacts for causing the force exerted by said restraining electromagnet in opposition to that exerted by said member gradually to decrease.

17. In a system for protecting against overload current flow, an inverse time overload protective device comprising, circuit controlling contacts, means for latching said contacts in engagement, a member operable to unlatch said contacts, means actuatable to operate said member, a second member adapted to actuate said second named means, a plurality of overload operating electromagnets, any one or more of which is adapted to cause said second member to exert force in an amount determined by the extent of the overload for actuating said second named means, circuit controlling contacts actuated by said second named means, a restraining electromagnet controlled by the second named contacts and operable upon actuation of said second named contacts to exert force to oppose actuation of said second named means by said second member to operate said first named member to unlatch the first named contacts until such force is overcome by the force exerted by said second member and means operable after actuation of said second named contacts for causing the force exerted by said restraining electromagnet is opposition to that exerted by said second member gradually to decrease.

18. In a system for protecting against overlaod current flow, an inverse time overload protective device comprising, circuit controlling contacts, means including a permanent magnet for latching said contacts in engagement, a member for actuating said contacts to effect their disengagement against the latching force of said permanent magnet, a lever for engaging said actuating member, a spider having three triangularly spaced operating arms, a plurality of overload operating electromagnets, one for each arm of said spider for actuating said spider, means adapted for actuation by said spider at the center thereof for moving said lever, a restraining electromagnet, a condenser connected across the coil of said restraining electromagnet, contacts actuated by said lever for controlling said restraining electromagnet, an armature for said restraining electromagnet, means connected to said armature for restricting movement of said second named means, upon actuation thereof by said spider, to an amount to move said lever sufficient to operate said restraining electromagnet controlling contacts until the force exerted on said second named means by said spider overcomes that exerted by said armature, said second named means thereupon being released for actuation by said spider an amount to move said lever into position engaging and actuating said first member to unlatch said first named contacts.

19. In a system subject to overload current flow in a plurality of circuits, an inverse time current limit protective device having a plurality of spaced electromagnets each including a coil and movable core, the coil of each of which is in series connection with a different one of said circuits, means controlling the current flow in said circuits, operating means controlling said circuit current control means, a movable member common to said electromagnets and connected to the movable core of each for attraction toward the magnets upon one or more coils being energized by overload current, the point of attachment to each core being equidistant from the point of attachment to each other core as measured in a continuous direction around the circumference of an imaginary circle that includes all points of attachment, a restraining electromagnet having a coil and a movable core, a source of unidirectional current normally connected through circuit connecting means across the coil of said restraining electromagnet, the movable core of said restraining magnet being connected to said member common to the electromagnets in a fashion opposed to that of said electromagnets and at a point within said imaginary circle on said common member and equidistant from said points of attachment of said electromagnet cores, means responsive to movement of said common movable member toward said electromagnets for first disconnecting said restraining electromagnet coil from its source of unidirectional current and upon continued such movement actuating said first mentioned operating means whereby to actuate said circuit current control means, and an electrical energy storage device connected across said restraining magnet coil whereby its stored energy is dissipated in said coil upon disconnection of said coil from its unidirectional source, said energy dissipation being effective to interpose substantially the same time delay between the disconnection of said restraining coil from its source and the actuation of said first mentioned operating means regardless whether overload current of a given value flows in one or more of said spaced electromagnet coils.

References Cited in the file of this patent

UNITED STATES PATENTS

| | | |
|---|---|---|
| 1,922,089 | Hovey | Aug. 15, 1933 |
| 2,339,125 | Winter | Jan. 11, 1944 |
| 2,626,377 | Leitch | Jan. 20, 1953 |
| 2,735,041 | Wurgler | Feb. 14, 1956 |